United States Patent
Kalogiros et al.

(10) Patent No.: US 12,442,886 B2
(45) Date of Patent: Oct. 14, 2025

(54) APPARATUS AND METHOD FOR DETERMINING A 3D DIRECTIONAL VECTOR BETWEEN A SENDING DEVICE AND A RECEIVING DEVICE

(71) Applicant: u-blox AG, Thalwil (CH)

(72) Inventors: Dimitris Kalogiros, Thalwil (CH); Ioannis Sarris, Thalwil (CH); Peter Karlsson, Thalwil (CH)

(73) Assignee: u-blox AG, Thalwil (CH)

(*) Notice: Subject to any disclaimer, the term of this patent is extended or adjusted under 35 U.S.C. 154(b) by 551 days.

(21) Appl. No.: 17/848,862

(22) Filed: Jun. 24, 2022

(65) Prior Publication Data

US 2023/0084336 A1 Mar. 16, 2023

(30) Foreign Application Priority Data

Jun. 30, 2021 (EP) .................................... 21182793

(51) Int. Cl.
*G01S 5/02* (2010.01)
*G01S 3/26* (2006.01)
(52) U.S. Cl.
CPC .............. *G01S 5/0268* (2013.01); *G01S 3/26* (2013.01)
(58) Field of Classification Search
CPC . G01S 5/0268; G01S 5/02; G01S 5/04; G01S 3/26; G01S 3/74; G01S 1/08; H04W 4/023; H04W 4/025; H04W 4/029
See application file for complete search history.

(56) References Cited

U.S. PATENT DOCUMENTS

| | | | |
|---|---|---|---|
| 2012/0190380 A1* | 7/2012 | Dupray | G01S 5/0278 455/456.1 |
| 2019/0123797 A1* | 4/2019 | Armand | H04B 7/0617 |
| 2020/0018811 A1* | 1/2020 | Lorenzen | G01S 3/38 |

OTHER PUBLICATIONS

Al-Sadoon MAG, Ali NT, Dama Y, Zuid A, Jones SMR, Abd-Alhameed RA, Noras JM. A New Low Complexity Angle of Arrival Algorithm for 1D and 2D Direction Estimation in MIMO Smart Antenna Systems. Sensors (Basel). Nov. 15, 2017;17(11):2631. (Year: 2017).*

(Continued)

*Primary Examiner* — Whitney Moore
(74) *Attorney, Agent, or Firm* — Fish & Richardson P.C.

(57) ABSTRACT

In a method for determining a 3D directional vector between a sending device and a receiving device, the receiving device comprises at least two antenna arrays that each comprise a plurality of linearly arranged antenna elements that are aligned to different orientations. The method comprises receiving, with the antenna arrays, a signal sent from the sending device, sampling, based on the received signal, outputs of each antenna element of each antenna array at a plurality of time instants, determining, for each antenna array, a Propagator Direct Data Acquisition, PDDA, pseudo-spectrum by performing a 1-dimensional PDDA, 1D-PDDA, based on the sampled outputs of the respective antenna array and on a plurality of steering vectors associated with the respective antenna array, determining a maximum of each PDDA pseudo-spectrum, determining an angular quantity ($\Psi$) for each antenna array based on the respective maximum of the PDDA pseudo-spectrum, and determining the 3D directional vector based on the angular quantities ($\Psi$) of each antenna array and on the orientations of the antenna arrays.

20 Claims, 8 Drawing Sheets

(56) References Cited

OTHER PUBLICATIONS

Seong Ro Lee, lickho Song, Yong Up Lee and Hong Gil Kim, "Estimation of distributed elevation and azimuth angles using linear arrays," Proceedings of MILCOM '96 IEEE Military Communications Conference, McLean, VA, USA, 1996, pp. 868-872 vol.3. (Year : 1996).*
Sesma, Vector and Egorov, Vector, "Improved Accuracy for Indoor Positioning with Bluetooth 5.1: From Theory to Measurements.", Department of Electrical and Information Technology Lund University, Sep. 1, 2020. (Year: 2020).*
Al-Sadoon et al., "A new low complexity angle of arrival algorithm for 1D and 2D direction estimation in MIMO smart antenna systems," Sensors, 2017, 17(11):2631.
Al-Sadoon, "Direction Finding and Beamforming Techniques using Antenna Array for Wireless System Applications—Simulation and Measurements of Various Antenna Array Structures Signal Processing for Direction of Arrival and Beamforming over Narrow and Wideband Spectrums for Localisation and Tracking Systems," Thesis for the degree of Doctor of Philosophy, University of Bradford, Faculty of Engineering and Informatics, Dec. 2019, 372 pages.
EP Extended Search Report in European Appln. No. 21182793.6, dated Apr. 8, 2022, 10 pages.
Lee et al., "Estimation of distributed elevation and azimuth angles using linear arrays," MILCOM '96, Military Communications Conference, IEEE, 1996, 3:868-872.
Palanisamy et al., "A new DOA estimation algorithm for wideband signals in the presence of unknown spatially correlated noise," Signal Processing, 2009, 89(10):1921-1931.

* cited by examiner

APPARATUS AND METHOD FOR DETERMINING A 3D DIRECTIONAL VECTOR BETWEEN A SENDING DEVICE AND A RECEIVING DEVICE

CROSS-REFERENCE TO RELATED APPLICATIONS

This application claims priority to European Application No. EP21182793.6, filed on Jun. 30, 2021, the contents of which are incorporated herein by reference in their entirety.

TECHNICAL FIELD

This disclosure relates to a method for determining a 3-dimensional, 3D, directional vector between a sending device and a receiving device. The disclosure further relates to an apparatus for and to a positioning system with a plurality of such apparatuses. The disclosure also relates to a computer program product and a non-volatile storage medium.

BACKGROUND ART

In many applications like indoor positioning systems, IPS, or real-time location services, RTLS, one key element is to gain knowledge about a direction from a known position of, for example, an anchor point and a position of an object like a tag. Such a direction can be found via the determination of an angle of arrival, AoA, or angle of departure, AoD, of a radio wave transmitted between the object and the anchor point.

For determining such a direction in 3D space with conventional solutions, for example, using a two-dimensional array of antenna elements and evaluate the signals received at each antenna element, for example by performing a two-dimensional pseudo-spectrum estimation to determine azimuth and elevation angles is known. However, such a two-dimensional pseudo-spectrum estimation is expensive in terms of computing.

SUMMARY OF INVENTION

An object to be achieved is to provide an improved direction finding concept that allows an efficient determination of directional vectors.

This object is achieved with the subject-matter of the independent claims. Embodiments and developments derive from the dependent claims.

The improved direction finding concept is based on the insight that instead of using and evaluating signals in connection with a two-dimensional array of antenna elements, two or more linear antenna arrays with linearly arranged antenna elements are used and evaluated with individual determination of pseudo-spectrums. Such linear arrays, for example, are Uniform Linear Arrays, ULA. Each of the linear arrays provides an angular quantity that depends on the angular direction, e.g. azimuth and elevation, between the antenna arrays and the unknown object. While such an angular quantity may be ambiguous for a single linear array, the combined evaluation of the angular quantities of two or more of the antenna arrays allows the determination of a 3D directional vector if the different orientations of the antenna arrays are known. Hence, determination of a 3D directional vector via the one-dimensional pseudo-spectra is computationally more efficient and still enables a high accuracy of the determined directional vector. For example, accuracy further increases if more than two linear antenna arrays are employed.

The improved direction finding concept is applicable to both an AoA and an AoD principle. With AoA, a receiving device, e.g. an anchor point, receives from a sending device a signal with two or more linear antenna arrays and evaluates the respective samples of each antenna element. In contrast, with AoD, the sending device, e.g. an anchor point, sends a signal with two or more linear antenna arrays separately in a timed sequence with each of the respective antenna elements. Due to the separation, this signal, received by the receiving device, can be evaluated via association with the timed sequence in a similar fashion via the one-dimensional pseudo-spectra.

In an embodiment of a method for determining a 3D directional vector between a sending device and a receiving device according to the improved direction finding concept, the receiving device comprises a first antenna array and at least a second antenna array, wherein the first and the second antenna array each comprise a plurality of linearly arranged antenna elements that are aligned to different orientations. In particular, the orientations of the linearly arranged antenna elements are different. For example, the two antenna arrays can be orthogonal to each other which may ease the computational effort, but other angles between the linear arrangements are possible too.

The method comprises receiving, with the first antenna array and the second antenna array, a signal sent from the sending device. Outputs of each antenna element of each of the first and the second antenna array are sampled, based on the received signal, at a plurality of time instants, e.g. subsequent time instants. For each antenna array of the first and the second antenna array, a Propagator Direct Data Acquisition, PDDA, pseudo-spectrum is determined by performing a one-dimensional PDDA, 1D-PDDA, based on the sampled outputs of the respective antenna array and on a plurality of steering vectors associated with the respective antenna array. A maximum of each PDDA pseudo-spectrum is determined. An angular quantity is determined for each of the first and the second antenna array based on the respective maximum of the PDDA pseudo-spectrum. Finally the 3D directional vector is determined based on the angular quantities of each of the first and the second antenna array and on the orientations of the first and the second antenna array.

Hence, the improved direction finding concept uses the relationship between the angular quantities of each antenna array with the known orientation of the antenna arrays and their dependency on each other.

The embodiment described above corresponds to an AoA principle, for example.

In another embodiment of a method for determining a 3D directional vector between a sending device and a receiving device according to the improved direction finding concept, that may correspond to an AoD principle, the sending device comprises a first antenna array and at least a second antenna array, wherein the first and the second antenna array each comprise a plurality of linearly arranged antenna elements that are aligned to different orientations. The same options apply for the orientations as described above.

The method comprises receiving, at the receiving device, a signal sent from the sending device, the signal being sent with each antenna element of the first antenna array and the second antenna array separately in a timed sequence, and generating signal samples for each antenna element of each of the first and the second antenna array by sampling the received signal at a plurality of time instants associated with the timed sequence.

The method further comprises determining, for each antenna array of the first and the second antenna array, a PDDA pseudo-spectrum by performing a 1D-PDDA based on the signal samples of the respective antenna array and on a plurality of steering vectors associated with the respective antenna array, and determining a maximum of each PDDA pseudo-spectrum. An angular quantity is determined for each of the first and the second antenna array based on the respective maximum of the PDDA pseudo-spectrum. Finally the 3D directional vector is determined based on the angular quantities of each of the first and the second antenna array and on the orientations of the first and the second antenna array.

For example, for each antenna array, each steering vector of the plurality of steering vectors depends on a geometry information of the respective antenna array and on potential angles of arrival of the received signal or angles of departure of the sent signal, respectively. The geometry information of each antenna array may include position information and/or spacing information of the comprised antenna elements, e.g. where the antenna elements are positioned and/or how they are spaced to each other.

In various embodiments the plurality of steering vectors associated with each antenna array is pre-calculated and/or stored in a memory. Hence, with a known arrangement of the antenna elements the steering vectors need not be recalculated, which further saves computational effort.

In various embodiments the first and the second antenna array have one antenna element in common. Hence, the antenna arrays have, for example, a cross-section at that common antenna element. However, this is not mandatory and antenna arrays without a common antenna element still can be employed.

In various embodiments the angular quantity for each of the first and the second antenna array is determined based on a position of the respective maximum of the PDDA pseudo-spectrum. Such a maximum can be taken as the maximum value of the calculated pseudo-spectrum values, but could also be determined as a maximum of an interpolated version of the pseudo-spectrum.

For example, in various embodiments determining the maximum of each PDDA pseudo-spectrum is performed with a polynomial approximation algorithm. For example, a Lagrange interpolation could be used for such polynomial approximation.

In various embodiments the method further comprises the determination of an angle of arrival of the received signal based on the 3D directional vector.

In the various embodiments, the received signal may be a Bluetooth direction finding signal or another radio frequency, RF, signal like a short range RF signal or even mid-range or long-range RF signal. For example, such an RF signal could be a Wi-Fi signal or a cellular signal.

As mentioned above, employing two linear antenna arrays is sufficient for carrying out the method according to the improved direction finding concept for both AoA and AoD. However, in various embodiments, the receiving device (for AoA) respectively the sending device (for AoD) may comprise at least one further antenna array, which comprises a plurality of antenna elements that are linearly arranged in an orientation different to the orientations of the first and the second antenna array.

In such a configuration, for AoA, the method further comprises receiving the signal sent from the sending device with the at least one further antenna array, sampling, based on the received signal, outputs of each antenna element of the at least one further antenna array at the plurality of time instants. It should be noted that e.g. for the example application with a Bluetooth Constant Tone Extension, CTE, as the signal sent by the sending device, sampling can be achieved with many ways, e.g. something between and including: 1) all antenna elements of all antenna arrays during the same CTE of a data packet, and 2) each antenna array at a different CTE, i.e. a CTE of a different data packet. However, due to the fixed setup of the data packets and the contained CTE, the respective time instants can correspond to each other.

In the same fashion as described above, at least one further PDDA pseudo-spectrum is determined by performing a 1D PDDA based on the sampled outputs of the at least one further antenna array and on a plurality of steering vectors associated with the at least one further antenna array.

For example, the antenna elements of the at least one further antenna array are arranged in a plane spanned by the first and the second antenna array.

Also in this case each steering vector of the plurality of steering vectors may depend on a geometry information of the at least one further antenna array and on potential angles of arrival of the received signal. A maximum of the at least one further PDDA pseudo-spectrum is determined and an angular quantity for the at least one further antenna array is determined based on the respective maximum of the at least one further PDDA pseudo-spectrum. Hence, the 3D directional vector is determined based on the angular quantities of each of the first, the second and the at least one further antenna array and on the orientations of the first, the second and the at least one further antenna array.

For AoD, the sending device also employs the antenna elements of the at least one further antenna array for sending the signal in the timed sequence, which signal is received and sampled accordingly at the receiving device. The remaining steps become easily apparent to the skilled reader from the description above, as only the additional signal samples are to be evaluated accordingly.

In another aspect of the improved direction finding concept, an apparatus for determining a 3D directional vector between a sending device (for AoA), respectively a receiving device (for AoD), and an antenna arrangement is disclosed. The antenna arrangement comprises a first antenna array and at least a second antenna array, wherein the first and the second antenna array each comprise a plurality of linearly arranged antenna elements that are aligned to different orientations. In particular, the arrangement of the antenna arrays may be implemented in any of the optional implementations described above in conjunction with the methods.

For AoA, the apparatus comprises a receiver connectable to the antenna arrangement and configured to sample, based on a signal received with the antenna arrangement from the sending device, outputs of each antenna element of each of the first and the second antenna array at a plurality of time instants.

For AoD, the apparatus comprises a receiver configured to receive a signal sent from the sending device, the signal being sent with each antenna element of the first antenna array and the second antenna array separately in a timed sequence, and to generate signal samples for each antenna element of each of the first and the second antenna array by sampling the received signal at a plurality of time instants associated with the timed sequence.

For both AoA and AoD, the apparatus further comprises a processing unit that may be configured to carry out the various method steps described above.

In particular, for AoA the processing unit may determine, for each antenna array of the first and the second antenna array, a PDDA pseudo-spectrum by performing a 1D-PDDA based on the sampled outputs of the respective antenna array and on a plurality of steering vectors associated with the respective antenna array.

For AoD, the processing unit may determine, for each antenna array of the first and the second antenna array, a PDDA pseudo-spectrum by performing a 1D-PDDA based on the signal samples of the respective antenna array and on a plurality of steering vectors associated with the respective antenna array For both AoA and AoD, the processing unit further determines a maximum of each PDDA pseudo-spectrum and determines an angular quantity for each of the first and the second antenna array based on the respective maximum of the PDDA pseudo-spectrum. The processing unit further determines the 3D directional vector based on the angular quantities of each of the first and the second antenna array and on the orientations of the first and the second antenna array.

Further implementations of the apparatuses become readily apparent for the skilled person from the various implementations described above in conjunction with the methods. For AoA, the apparatus may be an anchor point, for example. For AoD, the apparatus may be a tag, for example.

In another aspect of the improved direction finding concept, a positioning system for determining a position of a mobile device, e.g. a tag, is disclosed. The positioning system comprises a positioning engine and one of: a) the mobile device and a plurality of first anchor points, each first anchor point comprising an apparatus configured for AoA as described above; or b) the mobile device, which comprises an apparatus configured for AoD as described above, and a plurality of second anchor points comprising sending devices and associated antenna arrangements, in particular for sending out the signals in the described form. The positioning engine is configured to receive the respective 3D directional vectors associated with the mobile device from the plurality of first anchor points or from the mobile device, and to determine a position, of the mobile device, based on the received 3D directional vectors. For example, in case a), where the first anchor points determine the 3D directional vectors, these are received from the first anchor points, and in case b), where the mobile device determines the 3D directional vectors, these are received from the mobile device. For example, each directional vector indicates a direction between the mobile device and one of the anchors, for both AoA and AoD.

In such a configuration the positioning system comprises at least two of the first respectively second anchor points, whereas a higher number of anchor points increases the accuracy of the position determination.

According to one embodiment of the improved direction finding concept, a computer program product for determining a 3D directional vector comprises instructions that may be stored in a preferably non-transitory computer-readable storage medium, the instructions enabling a computer system to execute a method according to one of the implementations described above.

Furthermore, a computer system may have a processor and a storage medium having computer program instructions stored therein, enabling the processor to execute a method according to one of the implementations described above.

BRIEF DESCRIPTION OF DRAWINGS

The improved direction finding concept will be explained in more detail in the following with the aid of the drawings.

Elements and functional blocks having the same or similar function bear the same reference numerals throughout the drawings. Hence their description is not necessarily repeated in following drawings.

In the drawings:

FIG. 1 shows a flowchart of a method for determining a 3D directional vector;

FIG. 2 shows an example vector with spherical coordinates;

FIG. 3 shows an example representation of an antenna array with two elements;

FIGS. 4A and 4B show example schematic antenna arrangements;

FIGS. 5A and 5B show example configurations of a linear antenna array;

FIGS. 6 and 7 show example pseudo-spectrums;

FIG. 8 shows another example schematic antenna arrangement;

FIG. 9 shows an example configuration with an antenna arrangement and a target;

FIG. 10 shows an example of a tag and an anchor point with an antenna arrangement;

FIG. 11 shows another example of a tag and an anchor point with an antenna arrangement;

FIG. 12 shows an example of a positioning system; and

Figure 13:
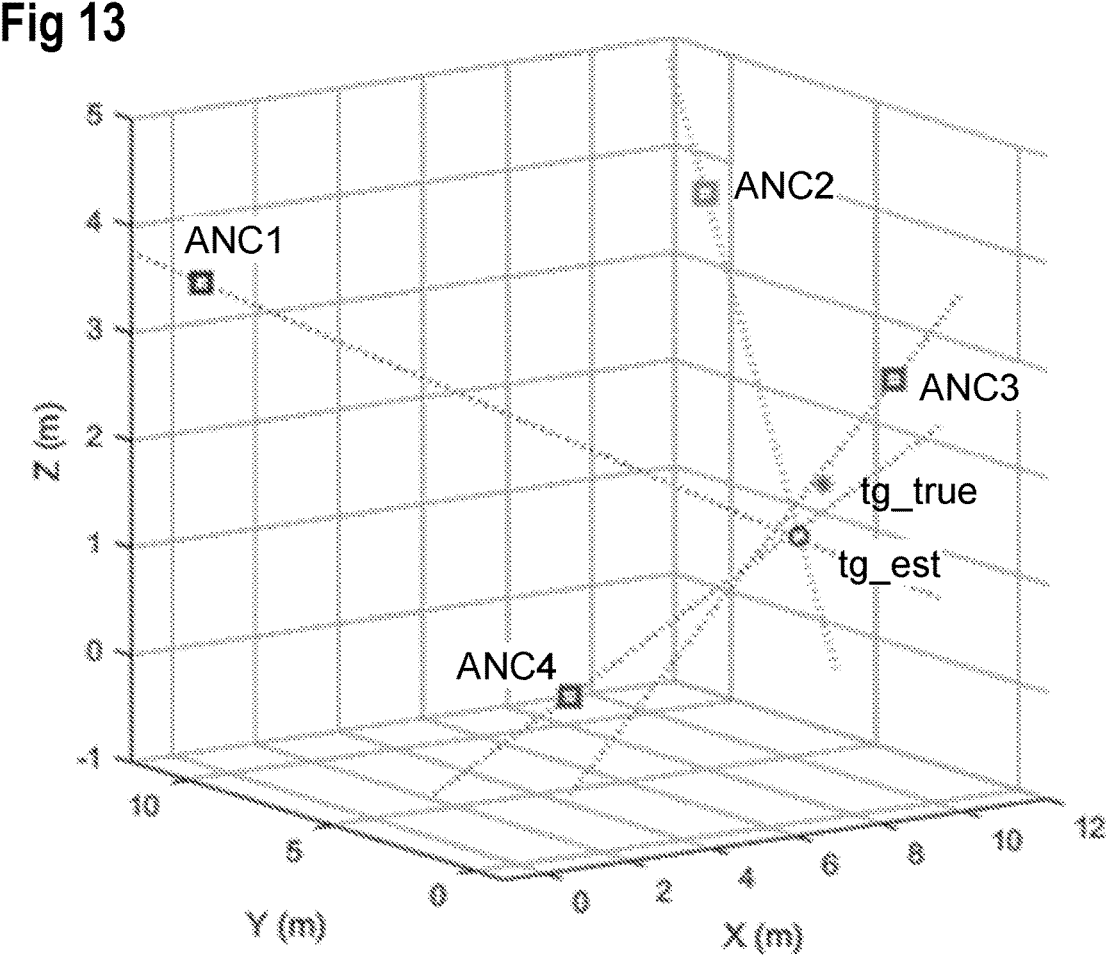

FIG. 13 shows a 3D view of anchors and a tag.

DETAILED DESCRIPTION

Figure 1:
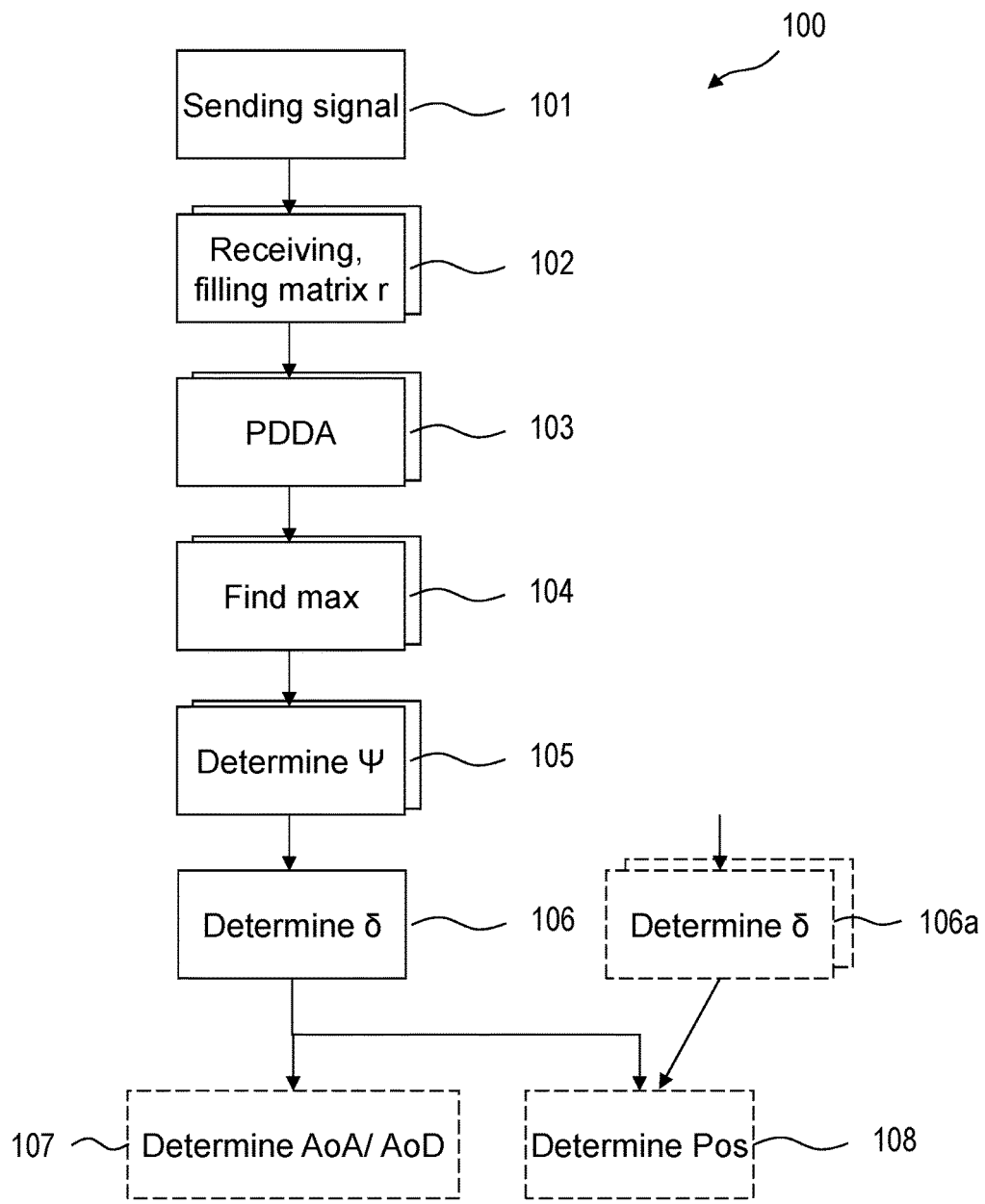

FIG. 1 shows a flow diagram of an example implementation of a method 100 for determining a 3D directional vector between a sending device and a receiving device. The sending device can be a tag that transmits an RF signal, like a Bluetooth direction finding signal, which includes a constant tone extension packet, CTE. Other RF signals like Wi-Fi signals or cellular signals could be used as an alternative, for example. The receiving device, which may be an anchor point or the like, comprises two or more antenna arrays with linearly arranged antenna elements for each antenna array, wherein the antenna elements are arranged such that they are aligned to different orientations. This allows, for example, direction finding with an AoA principle.

For implementing an AoD principle, the sending device may be an anchor point and the receiving device may be a tag.

In the following, the improved direction finding concept is described for an AoA principle.

Accordingly, in step 101, the sending device sends the RF signal, which is received by the receiving device in step 102. The signals transmitted from the sending device reach the antenna elements of the two or more antenna arrays with a slight phase shift relative to each other. Assuming that the signal propagates as a planar wave, the slight phase differences observed at each antenna element can be used to calculate its angle of arrival, AoA, respectively the directional vector in 3D space.

Figure 2:
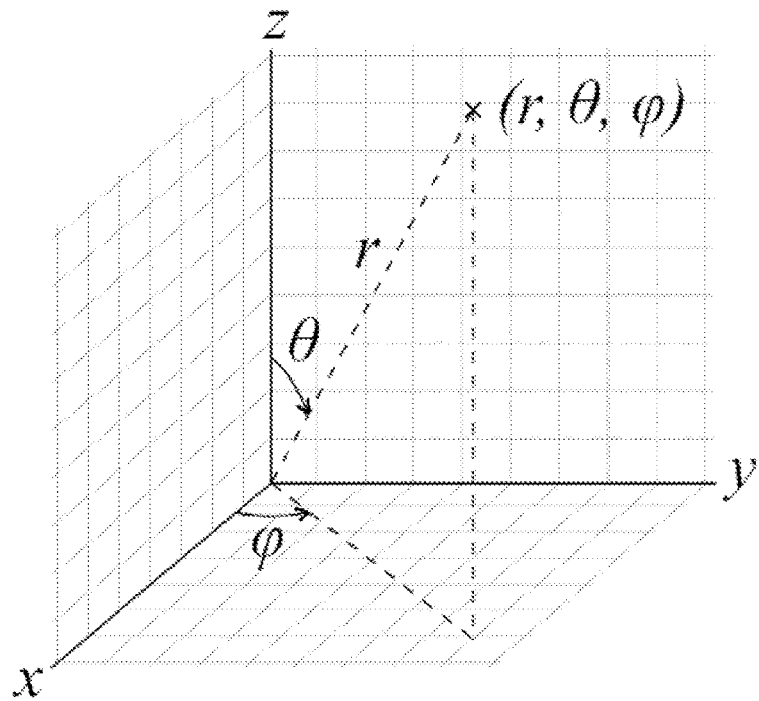

Referring now to FIG. 2, a definition of spherical coordinates is shown that is going to be used in this disclosure.

In mathematics, a spherical coordinate system is a coordinate system for three-dimensional space where the position of a point is specified by three numbers: the radial distance r of that point from a fixed origin, its polar angle θ measured from a fixed zenith direction, and the azimuthal angle φ of its orthogonal projection on a reference plane that passes through the origin and is orthogonal to the zenith, measured from a fixed reference direction on that plane.

The spherical coordinates vary at the following range:

$r \geq 0$ $0 \leq \theta \leq \pi$ $0 \leq \varphi < 2\pi$ or $-\pi < \varphi \leq \pi$ (1)

The transformation between spherical and Cartesian coordinates x, y, z is given by the following formulas:

$$r = \sqrt{x^2 + y^2 + z^2}$$ (2)

$$\theta = \cos^{-1}\left(\frac{z}{\sqrt{x^2+y^2+z^2}}\right) = \tan^{-1}\left(\frac{\sqrt{x^2+y^2}}{z}\right)$$

$$\varphi = \tan^{-1}\left(\frac{y}{x}\right)$$

$$x = r \cos\varphi \sin\theta$$ (3)

$$y = r \sin\varphi \sin\theta$$

$$z = r \cos\theta$$

Figure 3:
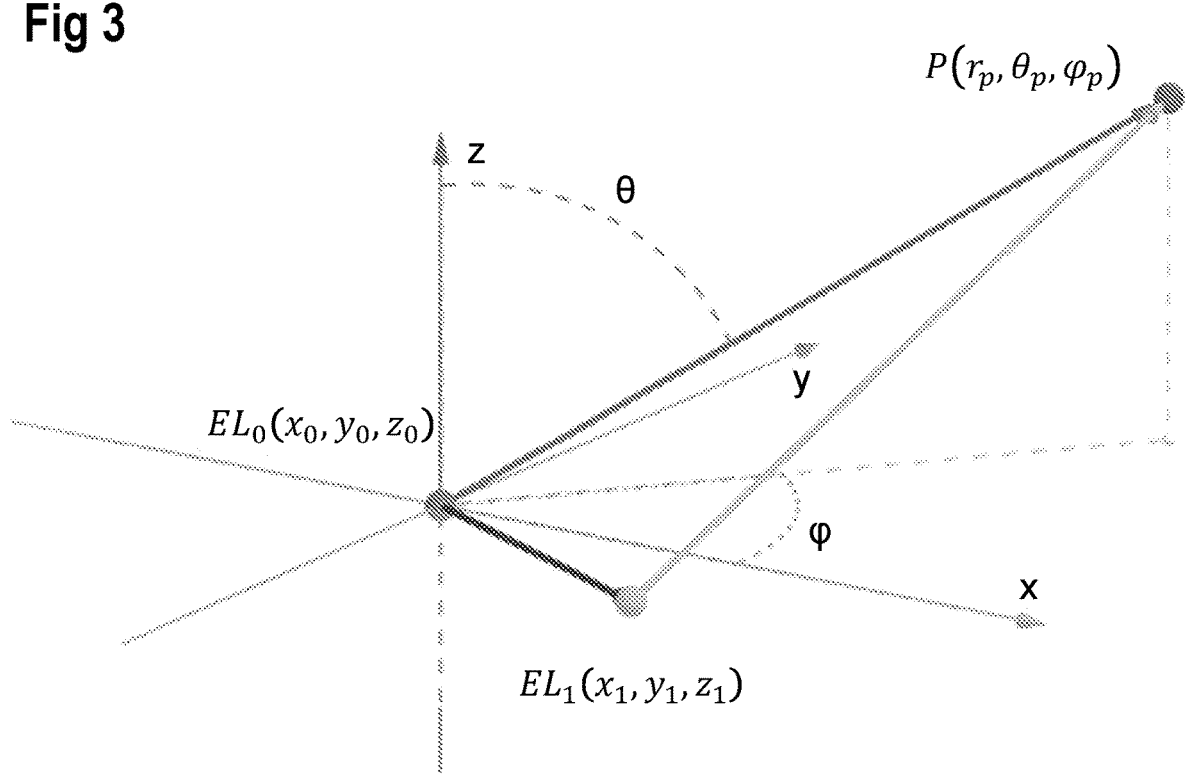

Referring now to FIG. 3, an antenna array as used in the receiving device is a group of antennas that are used for receiving or transmitting the same signals. For a receiver array, the signals received by all array elements can be combined and then processed for various applications, including the AoA estimation.

A main entity that characterizes an antenna array is the steering vector. For exploring the principle idea of a steering matrix as a combination of several steering vectors, and its derivation, FIG. 3 shows a two-element antenna array with a first antenna element $EL_0$ and a second antenna element $EL_1$.

Antenna element $EL_0(x_0, y_0, z_0)$ is placed at the origin of the reference frame. So, we have:

$$x_0 = y_0 = z_0 = 0$$ (4)

Another antenna element $EL_1(x_1, y_1, z_1)$ is placed somewhere in the space. The target P is located at the point $P(r_p, \theta_7, \varphi_p)$. Let $$\vec{u} = \frac{\overrightarrow{EL_0 P}}{\|\overrightarrow{EL_0 P}\|}$$

be the unit vector that has the direction from the axis origin towards the target's position. From (3) it will be:

$$\vec{u} = \cos\varphi_p \sin\theta_p \vec{i} + \sin\varphi_p \sin\theta_p \vec{j} + \cos\theta_p \vec{k}$$ (5)

Let the vector $\vec{v} = \overrightarrow{EL_0 EL_1}$ be the vector from the element $EL_0$ up to the element $EL_1$. It will be:

$$\vec{v} = (x_1 - x_0)\vec{i} + (y_1 - y_0)\vec{j} + (z_1 - z_0)\vec{k} = x_1 \vec{i} + y_1 \vec{j} + z_1 \vec{k}$$ (6)

The length difference of the two paths from point P towards the two antenna elements, will be given by $$\Delta S_{01} = \|\overrightarrow{EL_0 P}\| - \|\overrightarrow{EL_1 P}\| = \vec{v} * \vec{u},$$

where $\vec{v} * \vec{u}$ is the inner product of the two vectors. Using (5) and (6) we get:

$$\Delta S_{01} = \|\overrightarrow{EL_0 P}\| - \|\overrightarrow{EL_1 P}\| = x_1 \cos\varphi_p \sin\theta_p \pm y_1 \sin\varphi_p \sin\theta_p + z_1 \cos\theta_p$$ (7)

In fact, the quantity $\Delta S_{01}$ is the projection of $\vec{v}$ onto $\vec{u}$ (since $\|\vec{u}\|=1$) and contains the information which path is longer in its sign.

The received signal of the two antenna elements can be represented as:

$$r(t) = \begin{bmatrix} 1 \\ e^{j\frac{\Delta S_{01}}{\lambda}2\pi} \end{bmatrix}[s(t)] = \begin{bmatrix} 1 \\ e^{j\frac{x_1 \cos\varphi_p \sin\theta_p + y_1 \sin\varphi_p \sin\theta_p + z_1 \cos\theta_p}{\lambda}2\pi} \end{bmatrix}[s(t)]$$ (8)

where s(t) is the transmitted signal and $\lambda$ the corresponding wavelength.

In general, the steering vector for a target at a point $P(r, \theta, \varphi)$ and for a linear antenna array, LA, with M elements $EL_0(0,0,0)$, $EL_1(x_1, y_1, z_1)$, ..., $EL_k(x_k, y_k, z_k)$, ..., $EL_1(x_{M-1}, y_{M-1}, z_{M-1})$, is defined as $$\alpha(\theta, \varphi) = \begin{bmatrix} 1 \\ e^{j\frac{\Delta S_{01}}{\lambda}2\pi} \\ \vdots \\ e^{j\frac{\Delta S_{0k}}{\lambda}2\pi} \\ \vdots \\ e^{j\frac{\Delta S_{0(M-1)}}{\lambda}2\pi} \end{bmatrix} = \begin{bmatrix} 1 \\ e^{j\frac{x_1 \cos\varphi\sin\theta + y_1 \sin\varphi\sin\theta + z_1 \cos\theta}{\lambda}2\pi} \\ \vdots \\ e^{j\frac{x_k \cos\varphi\sin\theta + y_k \sin\varphi\sin\theta + z_k \cos\theta}{\lambda}2\pi} \\ \vdots \\ e^{j\frac{x_{M-1} \cos\varphi\sin\theta + y_{M-1} \sin\varphi\sin\theta + z_{M-1} \cos\theta}{\lambda}2\pi} \end{bmatrix}$$ (9)

Figure 4A:
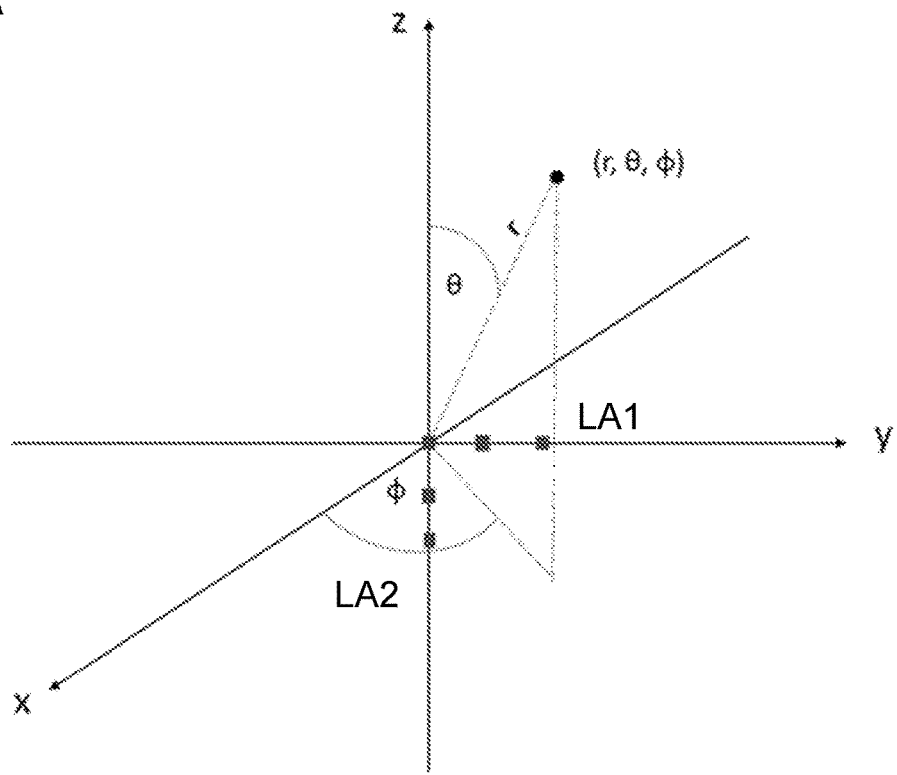
Figure 4B:
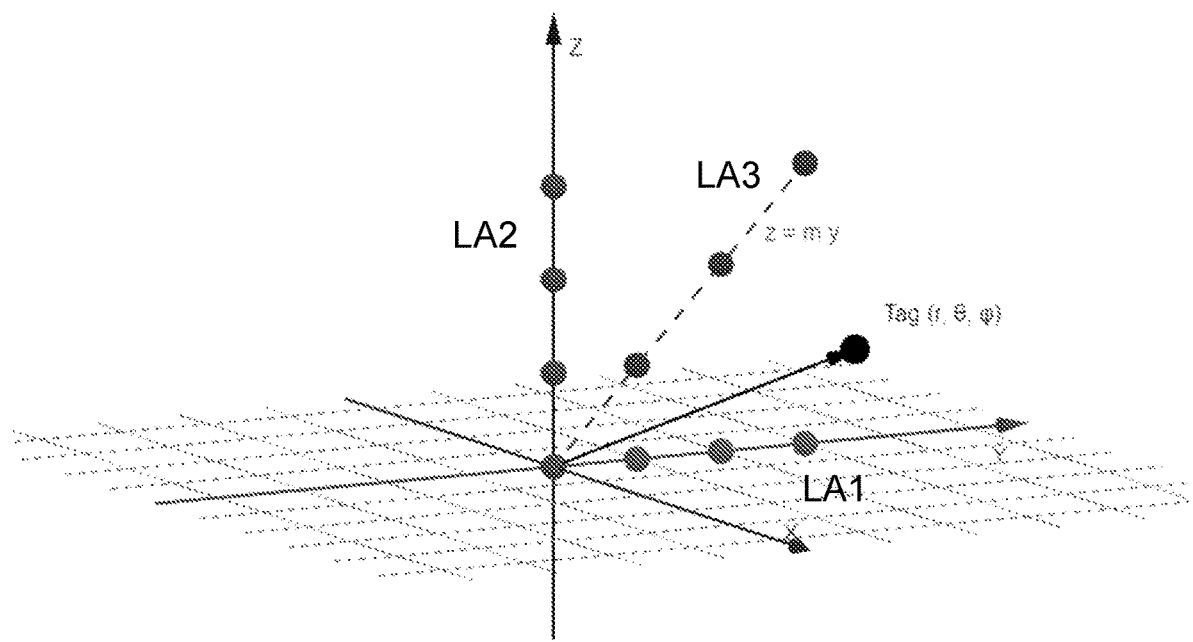

FIG. 4A and FIG. 4B show example implementations of combinations of linear antenna arrays in a schematic form. In both examples the antenna arrays are located in the y–z plane such that x=0 for all antenna elements. In FIG. 4A there are a first and a second linear antenna array LA1, LA2 with three antenna elements each. The two linear arrays LA1, LA2 share one common antenna element in the origin. While this has structural advantages, it is not mandatory.

Generally, there can be as many linear arrays as desired along radials on the y–z plane. For example, FIG. 4B shows an antenna arrangement with the first, the second and a third linear array LA3 described by the equation z=m*y and x=0, where m expresses the slope of the line. In the set of all possible radials the two main axes can also be included. The y axis is described by the equation z=0 and x=0 and the z axis is described by the equation y=0 and x=0.

Applying the generic equation (9), we derive the following steering vectors:

M-element LA on the Y axis:

$$\alpha(\theta, \varphi) = \begin{bmatrix} 1 \\ e^{j\frac{\Delta S_{01}}{\lambda}2\pi} \\ \vdots \\ e^{j\frac{\Delta S_{0k}}{\lambda}2\pi} \\ \vdots \\ e^{j\frac{\Delta S_{0(M-1)}}{\lambda}2\pi} \end{bmatrix} = \begin{bmatrix} 1 \\ e^{j\frac{y_1 \sin\varphi\sin\theta}{\lambda}2\pi} \\ \vdots \\ e^{j\frac{y_k \sin\varphi\sin\theta}{\lambda}2\pi} \\ \vdots \\ e^{j\frac{y_{M-1} \sin\varphi\sin\theta}{\lambda}2\pi} \end{bmatrix}$$ (10)

M-element LA on the Z axis:

$$\alpha(\theta,\varphi) = \begin{bmatrix} 1 \\ e^{j\frac{\Delta S_{01}}{\lambda}2\pi} \\ \vdots \\ e^{j\frac{\Delta S_{0k}}{\lambda}2\pi} \\ \vdots \\ e^{j\frac{\Delta S_{0(M-1)}}{\lambda}2\pi} \end{bmatrix} = \begin{bmatrix} 1 \\ e^{j\frac{z_1\cos\theta}{\lambda}2\pi} \\ \vdots \\ e^{j\frac{z_k\cos\theta}{\lambda}2\pi} \\ \vdots \\ e^{j\frac{z_{M-1}\cos\theta}{\lambda}2\pi} \end{bmatrix} \quad (11)$$

M-element LA on the z=my locus:

$$\alpha(\theta,\varphi) = \begin{bmatrix} 1 \\ e^{j\frac{\Delta S_{01}}{\lambda}2\pi} \\ \vdots \\ e^{j\frac{\Delta S_{0k}}{\lambda}2\pi} \\ \vdots \\ e^{j\frac{\Delta S_{0(M-1)}}{\lambda}2\pi} \end{bmatrix} = \quad (12)$$

$$\begin{bmatrix} 1 \\ e^{j\frac{y_1\sin\varphi\sin\theta + z_1\cos\theta}{\lambda}2\pi} \\ \vdots \\ e^{j\frac{y_k\sin\varphi\sin\theta + z_k\cos\theta}{\lambda}2\pi} \\ \vdots \\ e^{j\frac{y_{M-1}\sin\varphi\sin\theta + z_{M-1}\cos\theta}{\lambda}2\pi} \end{bmatrix} = \begin{bmatrix} 1 \\ e^{j\frac{y_1(\sin\varphi\sin\theta + m\cos\theta)}{\lambda}2\pi} \\ \vdots \\ e^{j\frac{y_k(\sin\varphi\sin\theta + m\cos\theta)}{\lambda}2\pi} \\ \vdots \\ e^{j\frac{y_{M-1}(\sin\varphi\sin\theta + m\cos\theta)}{\lambda}2\pi} \end{bmatrix}$$

Figure 5A:
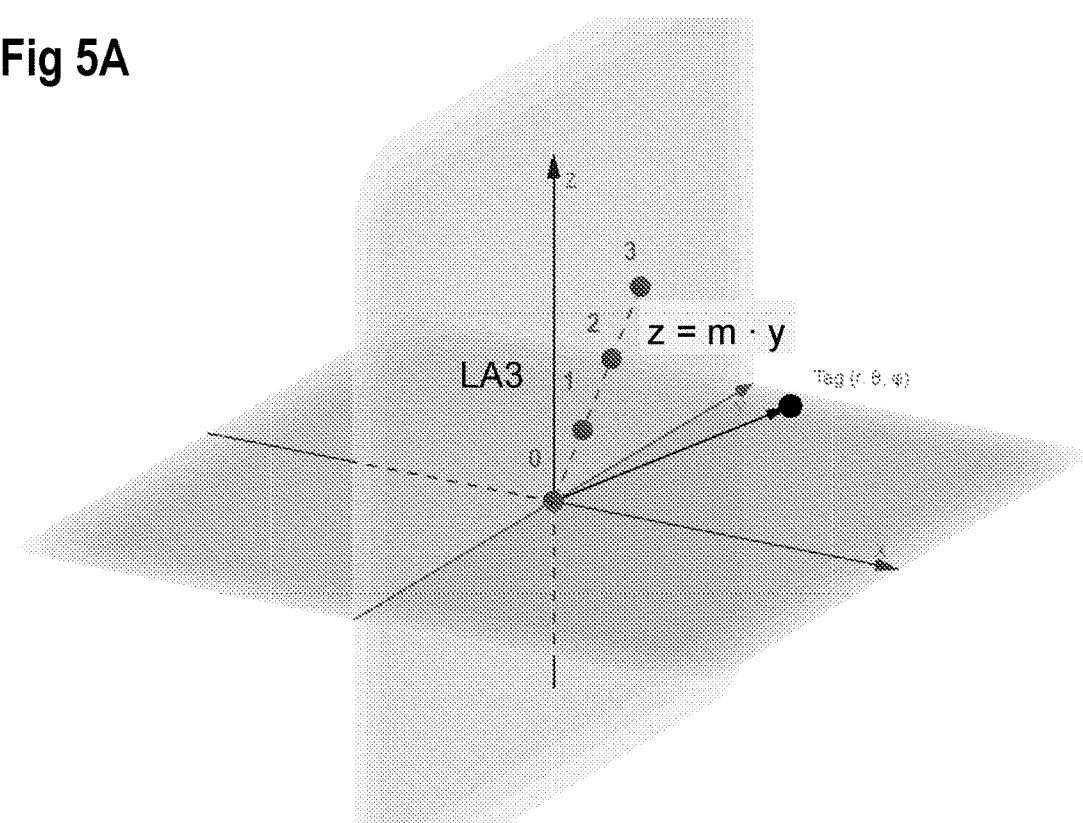
Figure 5B:
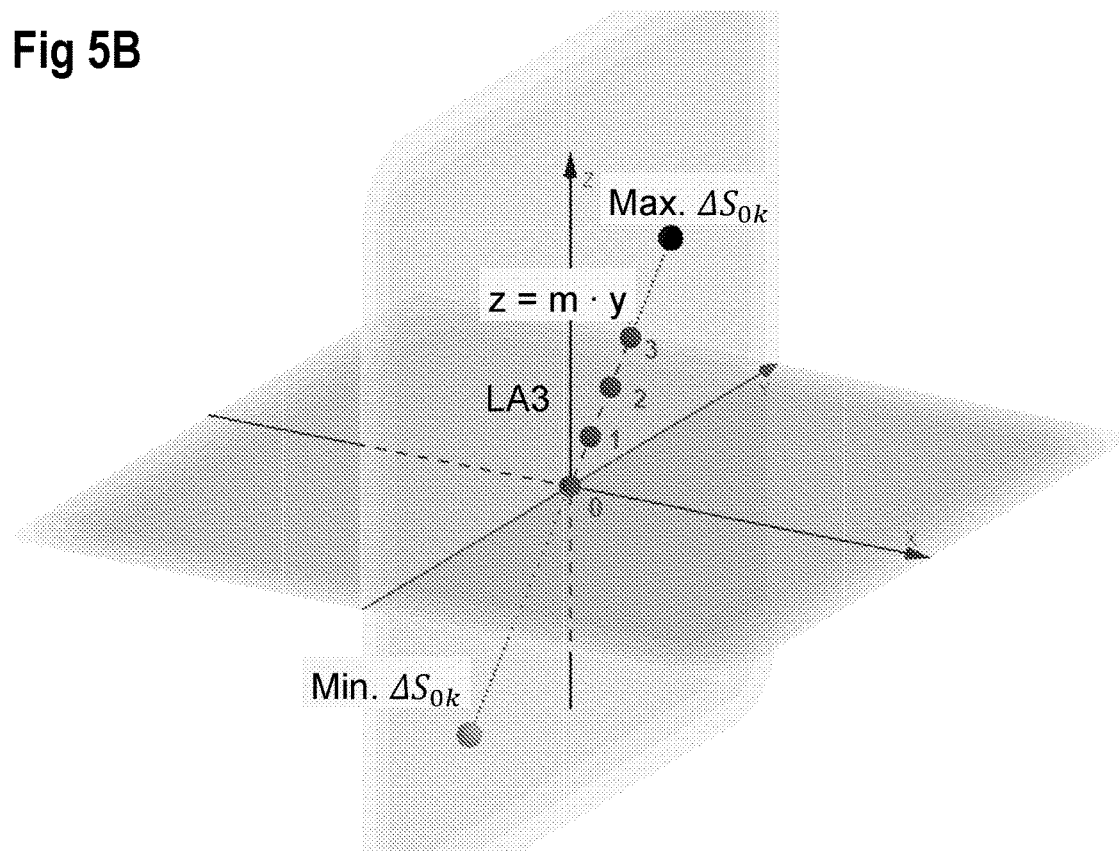

Without loss of generality, we will use for our analysis the case which is given by (12) and we will consider that M=4, as it is shown in FIGS. 5A and 5B.

From (12), we observe that the ratio of any two $\Delta S$ is independent of the values of the two angles $\varphi$, $\theta$ and therefore independent of the position of the tag. This becomes evident from the following equation:

$$\frac{\Delta S_{01}}{\Delta S_{0k}} = \frac{y_1(\sin\varphi\sin\theta + m\cos\theta)}{y_k(\sin\varphi\sin\theta + m\cos\theta)} = \frac{y_1}{y_k} \quad (13)$$

Our aim is to determine the quantity $\Delta S_{01}$ (or any other $\Delta S_{0k}$) and since the values $y_k$ are known, to estimate the quantity $\sin\varphi\sin\theta + m\cos\theta$.

Although the ratio of any two $\Delta S$ is independent of the tag's position, the phase of the exponential terms of the steering vector at (12), varies accordingly the values of the two angles. Let $d_{0k}$ be the length of the segment defined by antenna elements $EL_0$ and $EL_k$ (for example $d_{02}$ is the distance between element 0 and 2). Then, as it is shown in FIG. 5B, the range of $\Delta S_{0k}$ is the following:

$$-d_{0k} \leq \Delta S_{0k} \leq d_{0k} \quad (14)$$

If we choose to put the target at the position that maximizes the values of $\Delta S$, we will derive $\Delta S_{01}=d_{01}$ and $\Delta S_{0k}=d_{0k}$ and we can rewrite (13):

$$\frac{\Delta S_{01}}{\Delta S_{0k}} = \frac{y_1}{y_k} = \frac{d_{01}}{d_{0k}}, \forall k \quad (15)$$

The last equation (15) is valid for every value of, $\varphi$ and $\theta$ and proves that the ratio of the phases, e.g. the phases of the exponentials terms comprised in the steering vector of (12), depends only on the geometry of the LA and not on the position of the mobile tag.

Referring back to FIG. 1, Step 102, the outputs of the M antenna elements of each antenna array are sampled simultaneously at the time instants $t_1, t_2, \ldots, t_N$. Of course, due to implementation purposes, the sampling of the antenna elements may be sequential. However, with the use of signal processing techniques, an equivalent synchronous sampling can be obtained.

The signals, which are transmitted from the target, are assumed to travel through a medium and then impinge onto the M elements of the antenna. The transmission medium between the target's transmitter and the antenna elements is assumed to be isotropic and linear.

The target is located far from the antenna array such that the signal wavefront generated by its transmitter arrives at all the elements at an equal direction of propagation and the wavefront is planar (far-field approximation).

From the samples from the antenna arrays, the following matrix can be constructed for each antenna array, respectively:

$$r = \begin{bmatrix} r_0(t_1) & r_0(t_2) & \ldots & r_0(t_N) \\ r_1(t_1) & r_1(t_2) & \ldots & r_1(t_N) \\ \vdots & \vdots & \ldots & \vdots \\ r_{M-1}(t_1) & r_{M-1}(t_2) & \ldots & r_{M-1}(t_N) \end{bmatrix} \quad (16)$$

In step 103, a 1D-PDDA is performed, based on the sampled outputs of the respective antenna array.

This includes dividing the r matrix into two sub-matrices as follows:

$$\hat{h}_{1\times N} = [r_0(t_1)\, r_0(t_2) \ldots r_0(t_N)] \quad (17)$$

$$\mathcal{H}_{(M-1)\times N} = \begin{bmatrix} r_1(t_1) & r_1(t_2) & \ldots & r_1(t_N) \\ \vdots & \vdots & \ldots & \vdots \\ r_{M-1}(t_1) & r_{M-1}(t_2) & \ldots & r_{M-1}(t_N) \end{bmatrix}$$

Here, $\hat{h}$ represents the first row of the matrix r and $\mathcal{H}$ represents the remaining part.

From this, the propagator vector p can be computed:

$$p = \frac{1}{\hat{h}\cdot\hat{h}^H}\hat{h}\cdot\mathcal{H}^H \quad (18)$$

The propagator p is a 1×(M−1) vector

We construct the e vector, which is a M×1 vector, by adding a unit element:

$$e = [1\, p]^T \quad (19)$$

Regarding the steering vector, using (15) for a random position i of the target, it is defined $$\mu_i = \frac{\Delta S_{01}}{d_{01}} = \frac{\Delta S_{02}}{d_{02}} = \ldots = \frac{\Delta S_{0k}}{d_{0k}} = \ldots = \frac{\Delta S_{0(M-1)}}{d_{0(M-1)}} \quad (20)$$

For this random position i (which corresponds to the random values $\varphi_i$ and $\theta_i$), the steering vector is given by:

$$\alpha_i = \begin{bmatrix} 1 \\ e^{j\frac{\Delta S_{01}}{\lambda}2\pi} \\ \vdots \\ e^{j\frac{\Delta S_{0k}}{\lambda}2\pi} \\ \vdots \\ e^{j\frac{\Delta S_{0(M-1)}}{\lambda}2\pi} \end{bmatrix} = \begin{bmatrix} 1 \\ e^{j\frac{\mu_i d_{01}}{\lambda}2\pi} \\ \vdots \\ e^{j\frac{\mu_i d_{0k}}{\lambda}2\pi} \\ \vdots \\ e^{j\frac{\mu_i d_{0(M-1)}}{\lambda}2\pi} \end{bmatrix}, -1 \leq \mu_i \leq 1 \quad (21)$$

We can define a partitioning of the interval [−1,1] and receive the following steering matrix which corresponds to n positions of the target.

$$A = [\alpha_1 \ \alpha_2 \ \ldots \ \alpha_i \ \ldots \ \alpha_n] = \qquad (22)$$

$$\begin{bmatrix} 1 & 1 & \ldots & 1 & \ldots & 1 \\ e^{j\frac{\mu_1 d_{01}}{\lambda}2\pi} & e^{j\frac{\mu_2 d_{01}}{\lambda}2\pi} & \ldots & e^{j\frac{\mu_i d_{01}}{\lambda}2\pi} & \ldots & e^{j\frac{\mu_n d_{01}}{\lambda}2\pi} \\ \vdots & \vdots & \ldots & \vdots & \ldots & \vdots \\ e^{j\frac{\mu_1 d_{0k}}{\lambda}2\pi} & e^{j\frac{\mu_2 d_{0k}}{\lambda}2\pi} & \ldots & e^{j\frac{\mu_i d_{0k}}{\lambda}2\pi} & \ldots & e^{j\frac{\mu_n d_{0k}}{\lambda}2\pi} \\ \vdots & \vdots & \ldots & \vdots & \ldots & \vdots \\ e^{j\frac{\mu_1 d_{0(M-1)}}{\lambda}2\pi} & e^{j\frac{\mu_2 d_{0(M-1)}}{\lambda}2\pi} & \ldots & e^{j\frac{\mu_i d_{0(M-1)}}{\lambda}2\pi} & \ldots & e^{j\frac{\mu_n d_{0(M-1)}}{\lambda}2\pi} \end{bmatrix},$$

where $-1 \leq \mu_1 < \mu_2 < \ldots < y_i < \ldots < \mu_n \leq 1$

Usually, we define a uniform partitioning but in the general case the partitioning could be non-uniform.

Using the steering matrix of (22), the Propagator Direct Data Acquisition (PDDA) algorithm can be performed.

To this end, for each antenna array, the vector e is compared with each column of the steering matrix A in order to find which of them correlates better, by defining the PDDA pseudo-spectrum as:

$$P(i) = |\alpha_i^T \cdot e|^2|, 1 \leq i \leq n \qquad (23)$$

So, for each value of i we have the corresponding value P(i) of the pseudo-spectrum.

In step 104 the pseudo-spectrum values are searched to find the maximum among them. The maximum value indicates which $\alpha_i$ from (22) is closer to the sampled data and leads to the corresponding value of $\mu_i$ from (21).

Since $\mu_i$ is found, in step 105 we use equation (20) to find $\Delta S_{01}$, and a quantity W that depends on the angles $\varphi$ and $\theta$ (see equation (12)):

$$\Psi = \sin\varphi\sin\theta + m\cos\theta = \frac{\Delta S_{01}}{y_1} \qquad (24)$$

Figure 6:
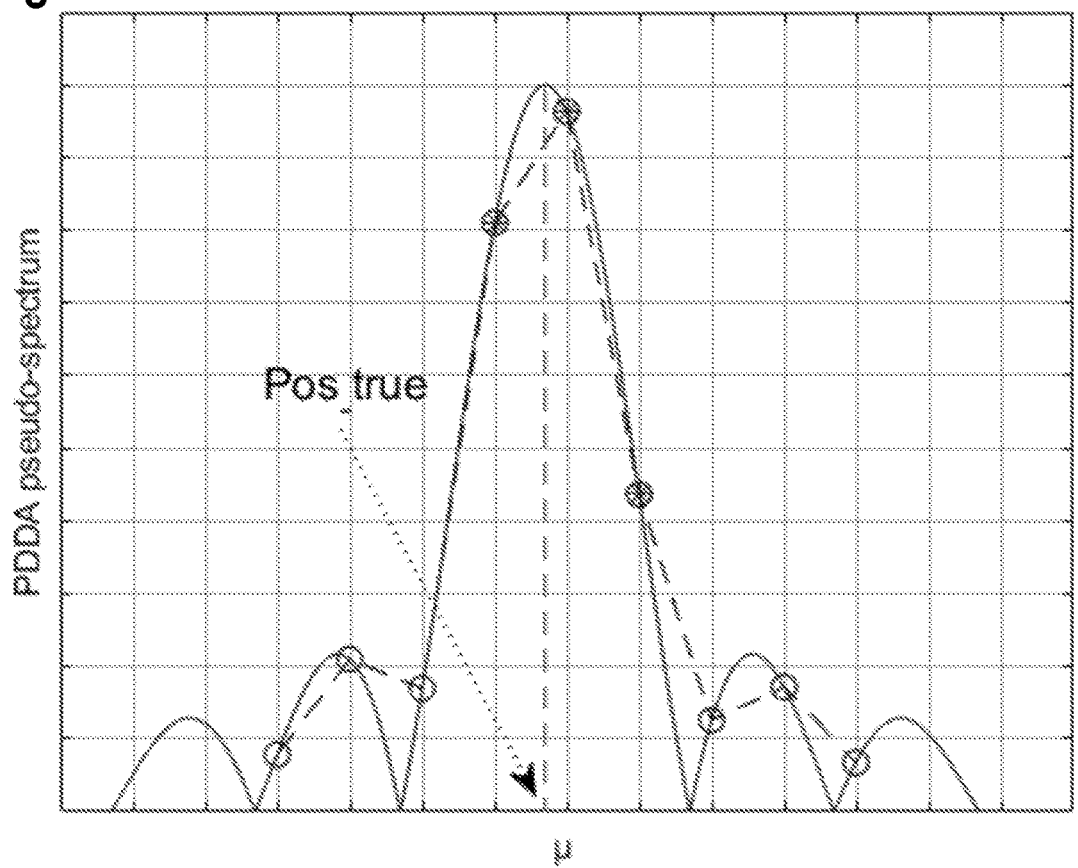

Referring now to FIG. 6, an example of a PDDA pseudo-spectrum is shown, wherein the circles denote the sparse samples, the asterisks denote the maximum and its neighbors and the solid line resembles dense samples. Pos_true indicates the true position of the maximum.

Using the sparse pseudo-spectrum samples, one can estimate the maximum of them and then, in conjunction with the neighborhood samples, estimate the exact position of the true maximum. Determining the maximum of each PDDA pseudo-spectrum e.g. is performed with a polynomial approximation algorithm. The polynomial approximation algorithm may be based on a Lagrange interpolation.

Figure 7:
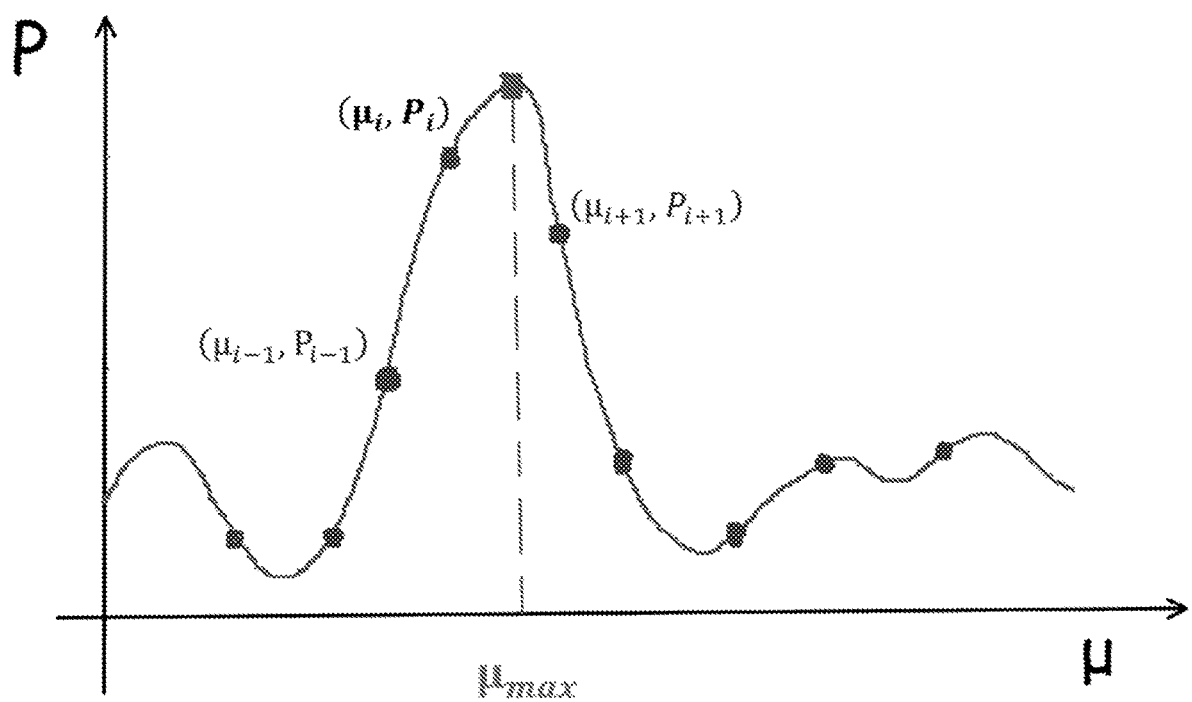

Referring now to FIG. 7, a graph of an example of a pseudo-spectrum is shown with the sampled value pairs $(\mu_i, P_i)$ at the sample maximum and its neighbors $(\mu_{i-1}, P_{i-1})$ and $(\mu_{i+1}, P_{i+1})$. With a Lagrange interpolation, the maximum $\mu_{max}$ can be interpolated. For example, if we consider the general case where the partitioning of (22) is not uniform, the value $\mu_{max}$ that corresponds to the true maximum is given by:

$$\mu_{max} = \frac{\mu_{i-1}^2(P_i - P_{i+1}) + \mu_{i+1}^2(P_{i-1} - P_i) - \mu_i^2(P_{i-1} - P_{i+1})}{2[\mu_{i-1}(P_i - P_{i+1}) + \mu_{i+1}(P_{i-1} - P_i) - \mu_i(P_{i-1} - P_{i+1})]} \qquad (25)$$

In the case of uniform partitioning, the above formula can be rewritten as:

$$\mu_{max} = \mu_i + \frac{P_{i-1} - P_{i+1}}{2(P_{i-1} - 2P_i + P_{i+1})}(\mu_i - \mu_{i-1}) \qquad (26)$$

Therefore, a maximum of each PDDA pseudo-spectrum and hence for each linear array is determined. With this manner we can estimate the exact value of the wanted $\mu_i$, although this $\mu_i$ is not initially included in the steering matrix of (22).

Figure 8:
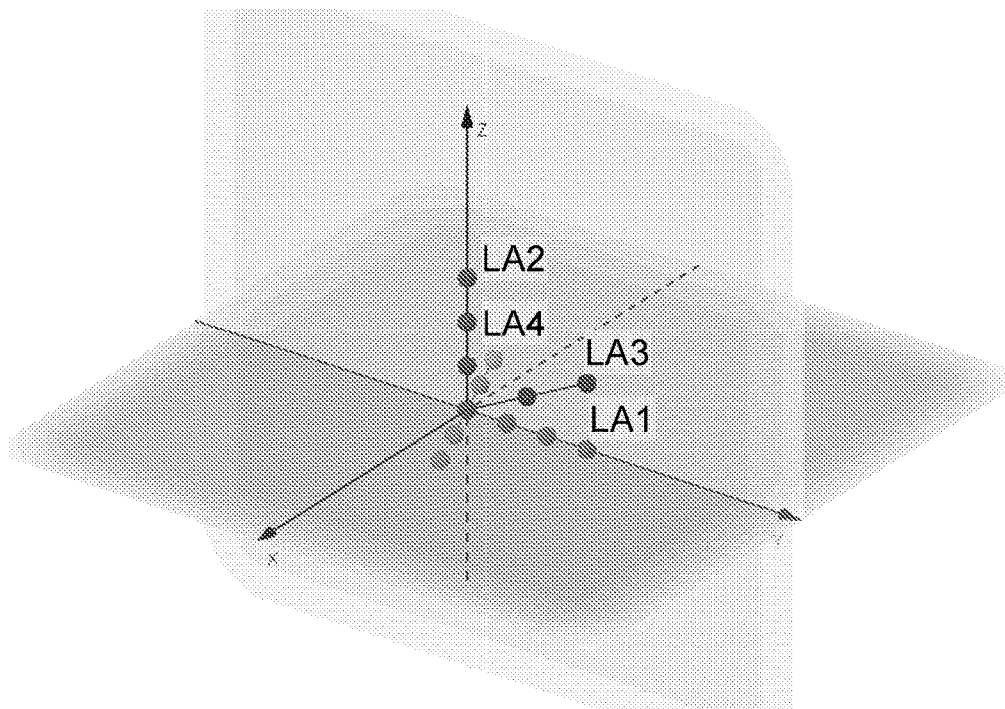

The derivation procedure of the steering matrix described by (22) proves that this form of steering matrix is applicable to each linear array such those depicted in FIG. 4B or those of FIG. 8.

More specifically, for the example that is depicted in FIG. 8, the following steering matrices could be created:

Provided that linear arrays LA1 and LA2 have identical dimensions, one can use (22) to produce for them a steering matrix $A_{1,2}^{(4 \times n)}$, which contains 4 rows.

For linear array LA3, (22) generates a 3 row steering matrix $A_3^{(3 \times n)}$.

Linear array LA4 could be assigned a 5 row steering matrix $A_4^{(5 \times n)}$.

In the example of FIG. 8, for all the four linear arrays, the reference antenna element "0", is the common element at the origin of the coordinate system.

These three steering matrices can been pre-calculated and stored to a memory, since they depend only on geometry information, i.e. the geometry and the distances between the antenna elements.

Figure 9:
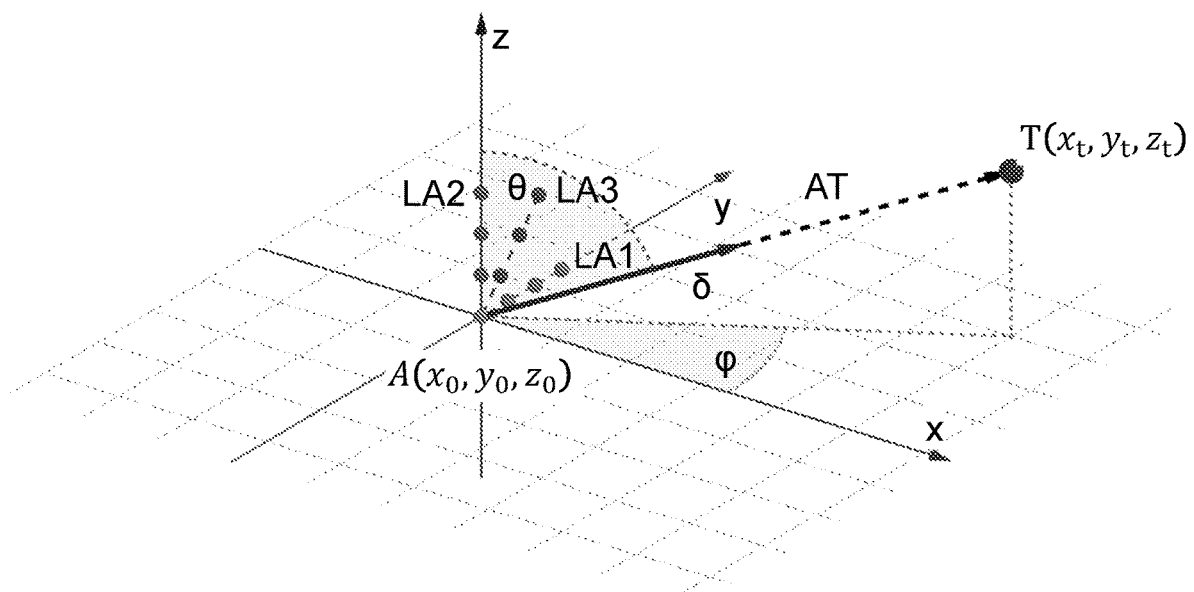

As an example, let us suppose that we have three radial linear arrays, as these at FIG. 4B or in FIG. 9. Assuming that we are using the 1D-PDDA approach, the following angular quantities are already calculated:

From elements on the Y-axis, the angular quantity $\psi_1 = \sin\varphi \sin\theta + E_1$ From elements on the Z-axis, the angular quantity $\psi_2 = \cos\theta + E_2$ From elements on the z=m·y locus, the angular quantity $\psi_3 = \sin\varphi \sin\theta + m\cos\theta + E_3$ Where the quantities $E_1$, $E_2$, $E_3$ encapsulate all the errors that maybe have been inserted due to various causes such as AWGN, multipath, etc. Moreover, although the antenna has been transferred to the point $(x_0, y_0, z_0)$ which probably differs from the point (0,0,0), the orientation of the axis remains the same.

Referring back to FIG. 1, in step 106, the direction on which the target is located, with respect to the reference antenna element at the origin of the axes, can be determined by the unit directional vector $\vec{\delta}$ shown in FIG. 9:

$$\vec{\delta} = \begin{bmatrix} \delta_i \\ \delta_j \\ \delta_k \end{bmatrix} = \begin{bmatrix} \cos\varphi\sin\theta \\ \sin\varphi\sin\theta \\ \cos\theta \end{bmatrix} \quad (27)$$

If we carefully observe the estimated quantities from each linear array, we conclude that they contain the two out of the three components of the directional vector $\vec{\delta}$. So, we derive the equation:

$$\underbrace{\begin{bmatrix} 1 & 0 \\ 0 & 1 \\ 1 & m \end{bmatrix}}_{C} \underbrace{\begin{bmatrix} \delta_j \\ \delta_k \end{bmatrix}}_{D_{jk}} = \underbrace{\begin{bmatrix} \psi_1 \\ \psi_2 \\ \psi_3 \end{bmatrix}}_{\Psi} \Rightarrow C \cdot D_{jk} = \Psi \quad (28)$$

Using the pseudo-inverse of matrix, we can calculate the least squares solution of equation (28):

$$C \cdot D_{jk} = \Psi \Rightarrow \hat{D}_{jk} = [(C^T \cdot C)^{-1} \cdot C^T] \cdot \Psi = \begin{bmatrix} \hat{\delta}_j \\ \hat{\delta}_k \end{bmatrix} \quad (29)$$

With (29), we have an estimation of components $\delta_j$ and $\delta_k$. Estimation of $\delta_i$ can be achieved by exploiting the fact that $\|\vec{\delta}\|=1$. Moreover, as the antenna may be a patch antenna which receives signals only from the half space which contains the positive portion of axis X, without loss of generality, we may assume that $\delta_i > 0$:

$$\|\vec{\delta}\| = 1 \Rightarrow \hat{\delta}_i = \sqrt{1 - \hat{\delta}_j^2 - \hat{\delta}_k^2} \quad (30)$$

Accordingly, with (30), determination of directional vector $\vec{\delta}$ in step 106 is completed.

Knowledge of the directional unit vector allow us to estimate angles $\theta$, $\varphi$ by means of (2), as shown as optional step 107 in FIG. 1. In fact, the calculation of the two angles becomes very attractive because the directional vector is unitary (see (30)). More specifically, (2) leads to:

$$\theta = \cos^{-1}(\hat{\delta}_k) \quad (31)$$

$$\varphi = \tan^{-1}\left(\frac{\hat{\delta}_j}{\hat{\delta}_i}\right)$$

The last set of equations can be implemented with little effort.

Alternatively, with reference to optional step 108 in FIG. 1, we can use two or more antenna arrangements to estimate the position of the tag, e.g. by means of a "Local Positioning Engine" (LPE). For this purpose, all we need is the unit directional vector $\vec{\delta}$ from each antenna arrangement (see step 106a in FIG. 1) as disclosed in more detail below.

Figure 10:
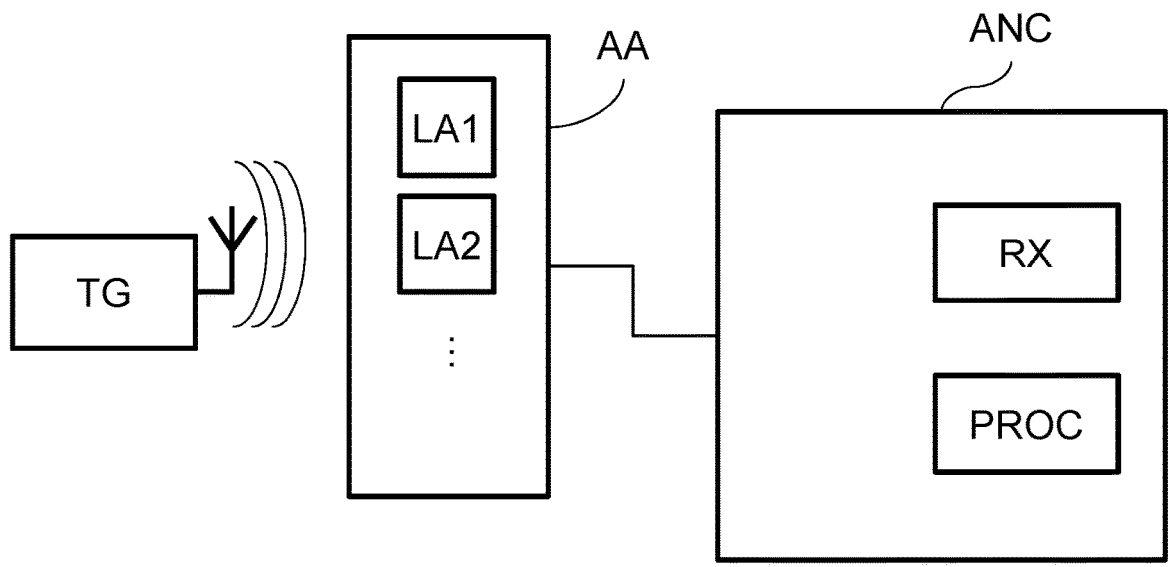

FIG. 10 shows an example implementation where the sending device is a tag TG, for example, that sends the signal, e.g. via a single antenna, to an antenna arrangement AA comprising two or more linear antenna arrays LA1, LA2 etc. The signal may be a constant tone extension, CTE, Bluetooth signal. The antenna arrangement AA is connected to an apparatus in the form of an anchor ANC that comprises a receiver RX and a processing unit PROC. For example, the receiver RX receives and samples the signal received from the antenna arrangement AA as described, for example, in conjunction with step 102 in FIG. 1.

The processing unit PROC may perform the determination of the PDDA pseudo-spectrum, determination of the maximum of each PDDA pseudo-spectrum, determination of the angular quantity $\psi$ and the determination of the 3D directional vector as described in conjunction with steps 103 to 106 in FIG. 1. Hence, with the arrangement of FIG. 10, determination of an angle of arrival, AoA, can be performed.

Figure 11:
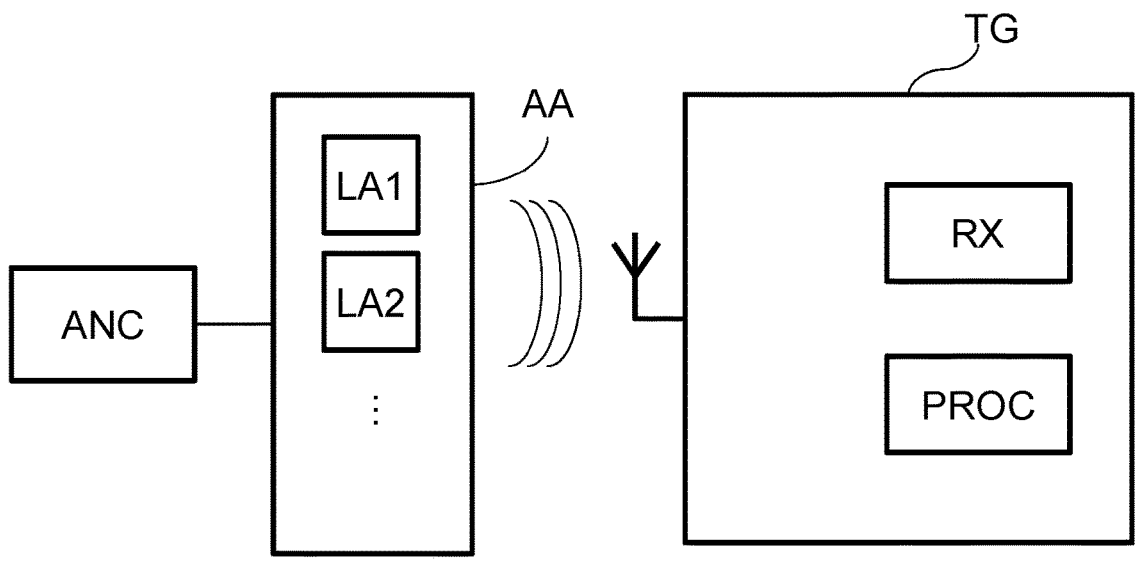

Referring now to FIG. 11, a similar arrangement is shown that is distinguished from the arrangement of FIG. 10 in that an angle of departure, AoD, is determined. To this end an anchor ANC is coupled to an antenna arrangement AA that can have the same structure with two or more linear antenna arrays as in the examples described above. The arrangement further comprises a tag TG with a single antenna, a receiver RX and a processing unit PROC.

In contrast to the AoA procedure, in the AoD procedure of FIG. 11 the anchor ANC controls the sending of a signal such that the signal is sent with each antenna element of the first antenna array LA1 and the second antenna array LA2 separately in a timed sequence. In other words, the signal is not sent out concurrently over more than one antenna element. On the receiving side, i.e. the tag TG, the signal is received and signal samples are generated for each antenna element of each of the first and the second antenna array LA1, LA2 by sampling the received signal at a plurality of time instants associated with the timed sequence. Each antenna element can be controlled to send out more than one signal segment in the timed sequence, e.g. by repeating sequences, such that at the receiving side the receiver can construct the r matrix as shown in equation (16).

Furthermore, the processing unit PROC of the tag TG can then perform the following steps described above to arrive at the directional vector between the anchor ANC and the tag TG. The tag TG, respectively the processing unit PROC, may have knowledge of the geometry information of the antenna arrays LA1, LA2 etc. e.g. in the form of associated steering matrices. Respective necessary modifications, if any, will be apparent to the skilled reader from the detailed description in conjunction with the AoA procedure described above.

It should be noted that both for setups based on AoA and AoD, the antenna arrangement AA with its antenna arrays could either be integrated on the anchor ANC or could be external to the anchor ANC as a separate element.

Figure 12:
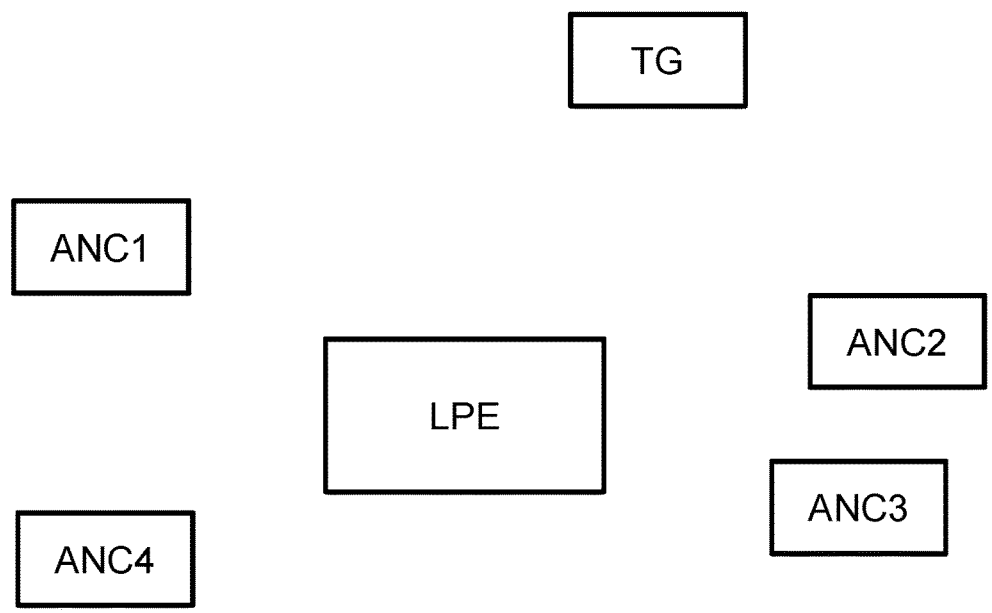

Referring now to FIG. 12, a positioning system for determining a position of a mobile device like a tag is shown. The positioning system comprises a positioning engine LPE and a plurality of anchor points. For example, in FIG. 12 the positioning system comprises a single tag TG and four anchor points ANC1, ANC2, ANC3, ANC4. The positioning engine LPE is configured to receive respective 3D directional vectors from the anchor points ANC1, ANC2, ANC3, ANC4 operating according to the AoA approach as described in conjunction with FIG. 10, or from the tag TG operating according to the AoD approach as described in conjunction with FIG. 11, and to determine a position of the tag TG, based on the respective received 3D directional vectors. In such a configuration it does not matter whether the directional vectors between the tag TG and the respective anchor points ANC1 to ANC4 are determined via an AoA procedure or an AoD procedure.

Referring now to FIG. 13, an example of an estimation of the position of a mobile tag with four anchor points ANC1 to ANC4 is shown. FIG. 13 shows the four anchor points together with their calculated directions between each anchor and the tag, which are shown as dotted lines.

To achieve the goal of estimating the tag's position, we must convert the information that is given by the unit directional vector $\vec{\delta}$ to the appropriate format. With respect to FIG. 9 and FIG. 13, we have the following calculations:

$$\vec{AT} = \begin{bmatrix} x_t - x_0 \\ y_t - y_0 \\ z_t - z_0 \end{bmatrix}, \vec{\delta} = \begin{bmatrix} \delta_i \\ \delta_j \\ \delta_k \end{bmatrix} \quad (32)$$

$$\vec{AT} // \vec{\delta} \Rightarrow \begin{cases} \dfrac{x_t - x_0}{y_t - y_0} = \dfrac{\delta_i}{\delta_j} \\ \dfrac{y_t - y_0}{z_t - z_0} = \dfrac{\delta_j}{\delta_k} \end{cases} \Rightarrow \begin{cases} \delta_j x_t - \delta_i y_t = \delta_j x_0 - \delta_i y_0 \\ \delta_k y_t - \delta_j z_t = \delta_k y_0 - \delta_j z_0 \end{cases}$$

Based on the last pair of equations which defines the AoA (or Direction of Arrival—DoA) (32), we can estimate the unknown position tg_true of the mobile target using the following algorithm.

Coordinates of the anchors and the unknown tag:

$$X = \begin{bmatrix} x \\ y \\ z \end{bmatrix} A_i = \begin{bmatrix} x_i \\ y_i \\ z_i \end{bmatrix}, 1 \le i \le 4$$

Definition of the matrix equation, using (32):

$$\underbrace{\begin{bmatrix} \delta_{1j} & -\delta_{1i} & 0 \\ 0 & \delta_{1k} & -\delta_{1j} \\ \delta_{2j} & -\delta_{2i} & 0 \\ 0 & \delta_{2k} & -\delta_{2j} \\ \delta_{3j} & -\delta_{3i} & 0 \\ 0 & \delta_{3k} & -\delta_{3j} \\ \delta_{4j} & -\delta_{4i} & 0 \\ 0 & \delta_{4k} & -\delta_{4j} \end{bmatrix}}_{D} \underbrace{\begin{bmatrix} x \\ y \\ z \end{bmatrix}}_{X} = \underbrace{\begin{bmatrix} \delta_{1j}x_1 - \delta_{1i}y_1 \\ \delta_{1k}y_1 - \delta_{1j}z_1 \\ \delta_{2j}x_2 - \delta_{2i}y_2 \\ \delta_{2k}y_2 - \delta_{2j}z_2 \\ \delta_{3j}x_3 - \delta_{3i}y_3 \\ \delta_{3k}y_3 - \delta_{3j}z_3 \\ \delta_{4j}x_4 - \delta_{4i}y_4 \\ \delta_{4k}y_4 - \delta_{4j}z_4 \end{bmatrix}}_{B} \Rightarrow D \cdot X = B \quad (33)$$

Estimation of the least square solution using pseudo-inverse:

$$\hat{X} = [(D^T D)^{-1} D^T] B \quad (34)$$

The last equation gives the least square estimation of the tag's position tg_est, based on the directional vectors of the four anchors ANC1 to ANC4.

It should be understood that despite the explanation with two or three linear arrays, as many linear arrays as desired can be used, but not less than two. For example, as the number of linear arrays is increased, the calculation of directional vectors becomes more reliable and immune to effects of multipaths and AWGN. Furthermore it should be noted that each linear array should contain at least two antenna elements. Usually linear arrays are uniform but this is not a necessary condition for the present disclosure. Furthermore, in many applications the linear arrays may be identical, uniform and the pattern of antenna elements may be completely symmetric. However, as seen in the example configurations of linear arrays, this is not the general case and for the present disclosure there is no strict requirement for antenna symmetry etc.

Various embodiments of the improved direction finding concept can be implemented in the form of logic in software or hardware or a combination of both. The logic may be stored in a computer readable or machine-readable storage medium as a set of instructions adapted to direct a processor of a computer system to perform a set of steps disclosed in embodiments of the improved direction finding concept. The logic may form part of a computer program product adapted to direct an information-processing device to automatically perform a set of steps disclosed in embodiments of the improved direction finding concept.

The specification and drawings are, accordingly, to be regarded in an illustrative rather than a restrictive sense. However, it will be evident that various modifications and changes may be made thereunto without departing from the scope of the invention as set forth in the claims.

LIST OF REFERENCE SIGNS

100 method for determining a 3D directional vector
101-108 steps
LA linear array
ANC anchor point
RX receiver
AA antenna arrangement
PROC processing unit
LPE positioning engine

The invention claimed is:

1. A method for determining a 3-dimensional (3D) directional vector between a sending device and a receiving device, the receiving device comprising a first antenna array and at least a second antenna array, wherein the first and the second antenna array each comprises a plurality of linearly arranged antenna elements that are aligned to different orientations, the method comprising:

receiving, with the first antenna array and the second antenna array, a signal sent from the sending device;

sampling, based on the received signal, outputs of each antenna element of each of the first and the second antenna array at a plurality of time instants;

determining, for each antenna array of the first and the second antenna arrays, a Propagator Direct Data Acquisition (PDDA) pseudo-spectrum by performing a 1-dimensional PDDA (1D-PDDA) based on the sampled outputs of the respective antenna array and on a plurality of steering vectors associated with the respective antenna array;

determining a maximum of each PDDA pseudo-spectrum;

determining an angular quantity ($\Psi$) for each of the first and the second antenna array based on the respective maximum of the PDDA pseudo-spectrum, wherein the angular quantity ($\Psi$) depends on an azimuthal angle ($\varphi$) and a polar angle ($\theta$); and determining the 3D directional vector based on the angular quantities ($\Psi$) of each of the first and the second antenna arrays and on the orientations of the first and the second antenna arrays, wherein determining the 3D directional vector comprises determining a unit directional vector ($\vec{\delta}$), wherein $\delta_i$, $\beta_j$ and $\delta_k$ are components of $\vec{\delta}$, $\vec{\delta}$ is represented by the azimuthal angle ($\varphi$) and the polar angle ($\theta$) as:

$$\vec{\delta} = \begin{bmatrix} \delta_i \\ \delta_j \\ \delta_k \end{bmatrix} = \begin{bmatrix} \cos\varphi\sin\theta \\ \sin\varphi\sin\theta \\ \cos\theta \end{bmatrix}.$$

2. The method according to claim 1, wherein, for each antenna array, each steering vector of the plurality of steering vectors depends on a geometry information of the respective antenna array and on potential angles of arrival of the received signal.

3. The method according to claim 2, wherein the geometry information of each antenna array includes at least one of position information or spacing information of the antenna elements comprised within the antenna array.

4. The method according to claim 1, wherein the plurality of steering vectors associated with each antenna array is at least one pre-calculated or stored in a memory.

5. The method according to claim 1, wherein the first and the second antenna arrays have one antenna element in common.

6. The method according to claim 1, wherein the angular quantity ($\Psi$) for each of the first and the second antenna arrays is determined based on a position of the respective maximum of the PDDA pseudo-spectrum.

7. The method according to claim 1, wherein determining the maximum of each PDDA pseudo-spectrum is performed with a polynomial approximation algorithm—that is based on a Lagrange interpolation.

8. The method according to claim 1, further comprising determining at least one of an angle of arrival or an angle of departure of the received signal based on the 3D directional vector.

9. The method according to claim 1, wherein the received signal is a Bluetooth direction finding signal or a radio frequency (RF) signal.

10. A method for determining a 3-dimensional (3D) directional vector between a sending device and a receiving device, the sending device comprising a first antenna array and at least a second antenna array, wherein the first and the second antenna array each comprises a plurality of linearly arranged antenna elements that are aligned to different orientations, the method comprising:
    receiving, at the receiving device, a signal sent from the sending device, the signal being sent with each antenna element of the first antenna array and the second antenna array separately in a timed sequence;
    generating signal samples for each antenna element of each of the first and the second antenna arrays by sampling the received signal at a plurality of time instants associated with the timed sequence;
    determining, for each antenna array of the first and the second antenna arrays, a Propagator Direct Data Acquisition (PDDA) pseudo-spectrum by performing a 1-dimensional PDDA (1D-PDDA) based on the signal samples of the respective antenna array and on a plurality of steering vectors associated with the respective antenna array;
    determining a maximum of each PDDA pseudo-spectrum;
    determining an angular quantity ($\Psi$) for each of the first and the second antenna arrays based on the respective maximum of the PDDA pseudo-spectrum, wherein the angular quantity ($\Psi$) depends on an azimuthal angle ($\varphi$) and a polar angle ($\theta$); and
    determining the 3D directional vector based on the angular quantities ($\Psi$) of each of the first and the second antenna arrays and on the orientations of the first and the second antenna arrays, wherein determining the 3D directional vector comprises determining a unit directional vector $\vec{\delta}$, wherein $\delta_i$, $\delta_j$ and $\delta_k$ are components of $\vec{\delta}$, $\vec{\delta}$ is represented by the azimuthal angle ($\varphi$) and the polar angle ($\theta$) as:

$$\vec{\delta} = \begin{bmatrix} \delta_i \\ \delta_j \\ \delta_k \end{bmatrix} = \begin{bmatrix} \cos\varphi\sin\theta \\ \sin\varphi\sin\theta \\ \cos\theta \end{bmatrix}.$$

11. The method according to claim 10, wherein, for each antenna array, each steering vector of the plurality of steering vectors depends on a geometry information of the respective antenna array and on potential angles of arrival of the received signal.

12. The method according to claim 11, wherein the geometry information of each antenna array includes at least one of position information or spacing information of the antenna elements comprised within the antenna array.

13. The method according to claim 10, wherein the plurality of steering vectors associated with each antenna array is at least one pre-calculated or stored in a memory.

14. The method according to claim 10, wherein the first and the second antenna arrays have one antenna element in common.

15. The method according to claim 10, wherein the angular quantity ($\Psi$) for each of the first and the second antenna arrays is determined based on a position of the respective maximum of the PDDA pseudo-spectrum.

16. An apparatus for determining a 3-dimensional (3D) directional vector between a sending device and an antenna arrangement, the antenna arrangement comprising a first antenna array and at least a second antenna array, wherein the first and the second antenna array each comprises a plurality of linearly arranged antenna elements that are aligned to different orientations, the apparatus comprising:
    a receiver connectable to the antenna arrangement and configured to sample, based on a signal received with the antenna arrangement from the sending device, outputs of each antenna element of each of the first and the second antenna arrays at a plurality of time instants; and
    a processing unit configured to:
        determine, for each antenna array of the first and the second antenna arrays, a Propagator Direct Data Acquisition (PDDA) pseudo-spectrum by performing a 1-dimensional PDDA (1D-PDDA) based on the sampled outputs of the respective antenna array and on a plurality of steering vectors associated with the respective antenna array;
        determine a maximum of each PDDA pseudo-spectrum;
        determine an angular quantity ($\Psi$) for each of the first and the second antenna arrays based on the respective maximum of the PDDA pseudo-spectrum, wherein the angular quantity ($\Psi$) depends on an azimuthal angle ($\varphi$) and a polar angle ($\theta$); and
        determine the 3D directional vector based on the angular quantities ($\Psi$) of each of the first and the second antenna arrays and on the orientations of the first and the second antenna arrays, wherein determining the 3D directional vector comprises determining a unit directional vector $\vec{\delta}$, wherein $\delta_i$, $\delta_j$ and $\delta_k$ are components of $\vec{\delta}$, $\vec{\delta}$ is represented by the azimuthal angle (φ) and the polar angle (θ) as:

$$\vec{\delta} = \begin{bmatrix} \delta_i \\ \delta_j \\ \delta_k \end{bmatrix} = \begin{bmatrix} \cos\varphi\sin\theta \\ \sin\varphi\sin\theta \\ \cos\theta \end{bmatrix}.$$

17. A positioning system for determining a position of a mobile device, the positioning system comprising:
a positioning engine (LPE) and one of:
the mobile device and a plurality of first anchor points, each first anchor point comprising an apparatus according to claim 16; or
the mobile device, which comprises an apparatus according to claim 12, and a plurality of second anchor points comprising sending devices and associated antenna arrangements,
wherein the positioning engine is configured to:
receive the respective 3D directional vectors associated with the mobile device from the plurality of first anchor points or from the mobile device; and
determine the position of the mobile device based on the received 3D directional vectors.

18. An apparatus for determining a 3-dimensional (3D) directional vector between a receiving device and an antenna arrangement, the antenna arrangement being coupled to a sending device and comprising a first antenna array and at least a second antenna array, wherein the first and the second antenna array each comprises a plurality of linearly arranged antenna elements that are aligned to different orientations, the apparatus comprising:
a receiver configured to:
receive a signal sent from the sending device, the signal being sent with each antenna element of the first antenna array and the second antenna array separately in a timed sequence; and
generate signal samples for each antenna element of each of the first and the second antenna arrays by sampling the received signal at a plurality of time instants associated with the timed sequence;
and
a processing unit configured to:
determine, for each antenna array of the first and the second antenna array, a Propagator Direct Data Acquisition (PDDA) pseudo-spectrum by performing a 1-dimensional PDDA (1D-PDDA) based on the signal samples of the respective antenna array and on a plurality of steering vectors associated with the respective antenna array;
determine a maximum of each PDDA pseudo-spectrum;
determine an angular quantity (Ψ) for each of the first and the second antenna arrays based on the respective maximum of the PDDA pseudo-spectrum, wherein the angular quantity (Ψ) depends on an azimuthal angle (φ) and a polar angle (θ); and
determine the 3D directional vector based on the angular quantities (Ψ) of each of the first and the second antenna arrays and on the orientations of the first and the second antenna arrays, wherein determining the 3D directional vector comprises determining a unit directional vector $\vec{\delta}$, wherein $\delta_i$, $\delta_j$ and $\delta_k$ are components of $\vec{\delta}$, $\vec{\delta}$ is represented by the azimuthal angle (φ) and the polar angle (θ) as:

$$\vec{\delta} = \begin{bmatrix} \delta_i \\ \delta_j \\ \delta_k \end{bmatrix} = \begin{bmatrix} \cos\varphi\sin\theta \\ \sin\varphi\sin\theta \\ \cos\theta \end{bmatrix}.$$

19. At least one non-transitory machine-readable storage medium comprising machine-readable instructions that, when executed by at least one computing device, cause the at least one computing device to determine a 3-dimensional (3D) directional vector between a sending device and a receiving device, the receiving device comprising a first antenna array and at least a second antenna array, wherein the first and the second antenna array each comprises a plurality of linearly arranged antenna elements that are aligned to different orientations, wherein determining the 3D directional vector comprises:
receiving, with the first antenna array and the second antenna array, a signal sent from the sending device;
sampling, based on the received signal, outputs of each antenna element of each of the first and the second antenna array at a plurality of time instants;
determining, for each antenna array of the first and the second antenna arrays, a Propagator Direct Data Acquisition (PDDA) pseudo-spectrum by performing a 1-dimensional PDDA (1D-PDDA) based on the sampled outputs of the respective antenna array and on a plurality of steering vectors associated with the respective antenna array;
determining a maximum of each PDDA pseudo-spectrum;
determining an angular quantity (Ψ) for each of the first and the second antenna array based on the respective maximum of the PDDA pseudo-spectrum, wherein the angular quantity (Ψ) depends on an azimuthal angle (φ) and a polar angle (θ); and
determining the 3D directional vector based on the angular quantities (Ψ) of each of the first and the second antenna arrays and on the orientations of the first and the second antenna arrays, wherein determining the 3D directional vector comprises determining a unit directional vector ($\vec{\delta}$), wherein $\delta_i$, $\delta_j$ and $\delta_k$ are components of $\vec{\delta}$, $\vec{\delta}$ is represented by the azimuthal angle (φ) and the polar angle (θ) as:

$$\vec{\delta} = \begin{bmatrix} \delta_i \\ \delta_j \\ \delta_k \end{bmatrix} = \begin{bmatrix} \cos\varphi\sin\theta \\ \sin\varphi\sin\theta \\ \cos\theta \end{bmatrix}.$$

20. At least one non-transitory machine-readable storage medium comprising machine-readable instructions that, when executed by at least one computing device, cause the at least one computing device to determine a 3-dimensional (3D) directional vector between a sending device and a receiving device, the receiving device comprising a first antenna array and at least a second antenna array, wherein the first and the second antenna array each comprises a plurality of linearly arranged antenna elements that are aligned to different orientations, wherein determining the 3D directional vector comprises:
receiving, at the receiving device, a signal sent from the sending device, the signal being sent with each antenna element of the first antenna array and the second antenna array separately in a timed sequence;

generating signal samples for each antenna element of each of the first and the second antenna arrays by sampling the received signal at a plurality of time instants associated with the timed sequence;

determining, for each antenna array of the first and the second antenna arrays, a Propagator Direct Data Acquisition (PDDA) pseudo-spectrum by performing a 1-dimensional PDDA (1D-PDDA) based on the signal samples of the respective antenna array and on a plurality of steering vectors associated with the respective antenna array;

determining a maximum of each PDDA pseudo-spectrum;

determining an angular quantity ($\Psi$) for each of the first and the second antenna arrays based on the respective maximum of the PDDA pseudo-spectrum, wherein the angular quantity ($\Psi$) depends on an azimuthal angle ($\varphi$) and a polar angle ($\theta$); and determining the 3D directional vector based on the angular quantities ($\Psi$) of each of the first and the second antenna arrays and on the orientations of the first and the second antenna arrays, wherein determining the 3D directional vector comprises determining a unit directional vector $\vec{\delta}$, wherein $\delta_i$, $\delta_j$ and $\delta_k$ are components of $\vec{\delta}$, $\vec{\delta}$ is represented by the azimuthal angle ($\varphi$) and the polar angle ($\theta$) as:

$$\vec{\delta} = \begin{bmatrix} \delta_i \\ \delta_j \\ \delta_k \end{bmatrix} = \begin{bmatrix} \cos\varphi\sin\theta \\ \sin\varphi\sin\theta \\ \cos\theta \end{bmatrix}.$$

* * * * *